F. BÖHM.
ALARM DEVICE FOR LOCOMOTIVES.
APPLICATION FILED OCT. 26, 1921.

1,408,257.

Patented Feb. 28, 1922.

Witnesses:

Inventor:
Fritz Böhm

UNITED STATES PATENT OFFICE.

FRITZ BÖHM, OF ROTHENBACH, GERMANY.

ALARM DEVICE FOR LOCOMOTIVES.

1,408,257.  Specification of Letters Patent.  Patented Feb. 28, 1922.

Application filed October 26, 1921. Serial No. 510,660.

*To all whom it may concern:*

Be it known that I, FRITZ BÖHM, a citizen of the German Republic, residing at Rothenbach, Germany, have invented certain new and useful Improvements in Alarm Devices for Locomotives, of which the following is a specification.

This invention relates to an alarm device for locomotives which is adapted to be operated by an abutment arranged near or on the rails connected with the signal in such a manner that it will operate the alarm signal when, the line signal being in the stop position, the engine runs past the stop signal. The characteristic feature of the invention is that an alarm bell is, together with the device which operates the same, adjustably mounted upon the locomotive in such a manner that it can be brought by the abutment lever on the rail operated from the line signal, in reach of a cam fixed upon the wheel axle. This cam operates the alarm bell. At the same time a special pawl and toothed wheel arrangement in connection with a fixed rack moves the device gradually away from the wheel axle so that the alarm device is returned automatically into the normal position. The device is of very simple construction and its cost of manufacture is low.

The means for automatically returning the device to the normal position consist essentially of a revoluble toothed wheel upon the movable plate of the alarm device and gearing with a rack fixed to the locomotive and of a pawl lever hinged to the lever which operates the alarm bell.

In order that the invention may be clearly understood, I shall proceed to describe the same with reference to the form of construction shown by way of example by the two figures of the accompanying drawing in two different positions.

Figure 1:
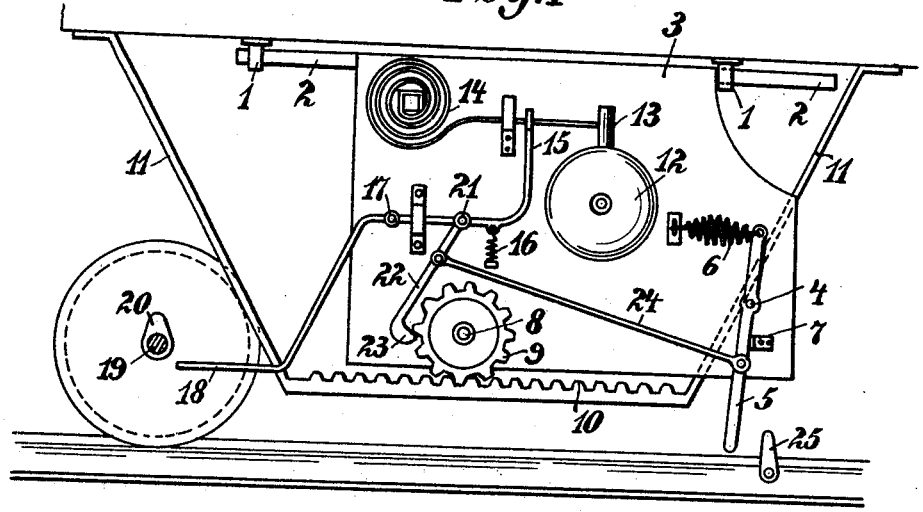
Fig. 1 shows the device in the position of rest.

Under the locomotive two brackets 1 are fixed in which the guide rods 2 can be movably mounted. A plate 3 of sheet metal is fixed to said rods 2. A lever 5 is arranged upon the plate 3 so that it can oscillate around a pivot pin 4. A spring 6 attached to the upper end of said pivot pin 4 presses the same against a stop 7. The lower end of lever 5 projects over the lower edge of plate 3 so that it can come in contact with a lever 25 which is pivotally mounted between the rails so that it can be raised or lowered from the line signal. Upon the plate 3 a toothed wheel 9 is revolubly mounted upon an axle 8 and meshes with a rack 10 which is fixed to the locomotive by means of arms 11. An alarm bell 12 is further fixed upon the plate 3 against which a clapper 13 can strike which is controlled by a spring 14. A two-armed lever pivotally mounted upon a bolt 17 fixed in plate 3 is adapted to act with its upper arm 15 upon said clapper 13, the lower arm 18 of said lever being adapted to be acted upon by a cam 20 of the wheel axle 19 of the locomotive.

The upper arm 15 of the lever has a pivot bolt 21 on which an arm 22 is pivotally fixed whose hook-shaped lower end 23 engages with the teeth of the toothed wheel 9. The arm 22 is connected with the lever 5 by a rod 24.

The device operates as follows:—

Figure 2:
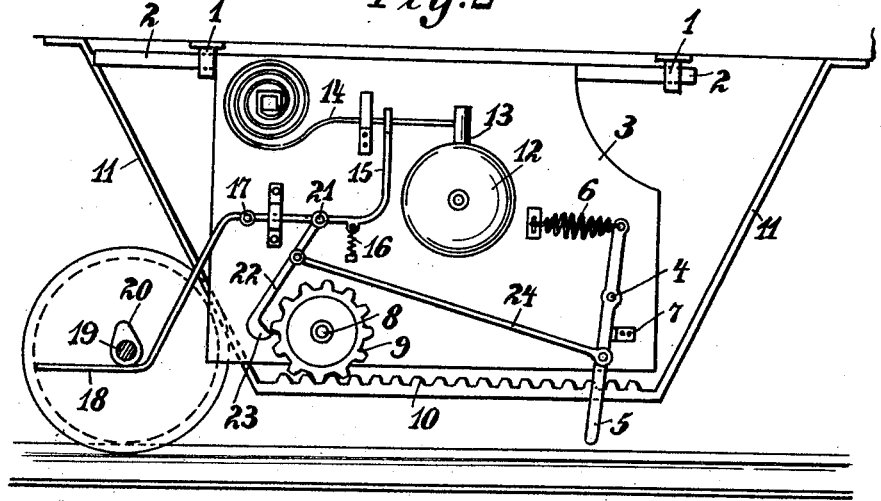
Fig. 2 shows the same in the working position.

When the line signal stands at stop the abutment lever 25 is in upright position and projects into the path of the lever 5. When the locomotive runs past the signal, lever 5 strikes against the abutment lever 25 and swings to the left against the action of spring 6 whereby the hook-shaped end 23 of the arm 22 is lifted out of the teeth of the toothed wheel 9. At the same time the plate 3 is pushed from the normal position upon the rods 2 (Fig. 1) into the position Fig. 2 whereby arm 10 is brought into the way of the cam 20 so that it is depressed and released again by said cam 20 once at each revolution of the wheel axle 19. The clapper 13 is thus made to strike against the alarm bell. When the locomotive has run past the abutment lever 25 the lever 5 is released and it is returned to its normal position by the action of spring 6 so that the connecting rod 24 pulls the hook-shaped end 23 of lever 22 again in engagement with the toothed wheel 9. The hook-shaped end 23 is formed so that it slides over the teeth of toothed wheel 9 when it is lowered but that it draws the toothed wheel along when it is raised. At each stroke of the clapper 13 the hook-shaped end 23 or pawl is thus operated and the toothed wheel 9 revolved for one tooth whereby said toothed wheel gearing with the fixed rack 10 the plate 3 is gradually moved to the right from the position Fig. 2 into the position Fig. 1. The arm 18 of the double lever is thus gradually brought out of the reach of cam 20 so that the device is returned to the normal position.

I claim:—

An improved alarm device for locomotives adapted to be operated by an abutment lever arranged on the line and raised or lowered from the line signal comprising in combination a guide rod fixed under the locomotive, a vertical plate movably mounted upon said guide rod, an alarm bell fixed upon said plate, a clapper for said alarm bell, a two-armed lever pivotally arranged upon said plate so that its upper arm can operate said clapper, a cam upon the axle, a wheel of the locomotive, the lower arm of said two-armed lever arranged so that it is acted upon by said cam when said plate has been moved to the left, a spring influenced abutment lever pivotally fixed upon said plate so that its lower end projects over the lower edge of the plate and can be pushed to the left by the abutment lever on the line, whereby the plate is moved to the left, a rack below said plate, arms for fixing said rack to the locomotive, a toothed wheel revolubly mounted upon said plate so that it meshes with said rack, a pawl lever pivotally mounted upon said plate hinged at the upper end of the upper arm of said two-armed lever, the pawl and the lower end of said pawl lever engaging with said toothed wheel and a rod connecting said pawl lever with said abutment lever of the plate so that it is brought out of engagement with said toothed wheel when the abutment lever of the plate is shifted by said abutment lever of the line and brought in engagement with said toothed wheel when said abutment lever of the plate is released again.

In testimony whereof I affix my signature in presence of two witnesses.

FRITZ BÖHM.

Witnesses:
FRIEDRICH BARTH,
ALFRED HOFFMANN.